(12) United States Patent
Kazmi et al.

(10) Patent No.: US 11,006,287 B2
(45) Date of Patent: May 11, 2021

(54) USER EQUIPMENT AND NETWORK NODE FOR CONFIGURING MEASUREMENTS OF CELLS AND BEAMS IN A WIRELESS COMMUNICATION SYSTEM

(71) Applicant: TELEFONAKTIEBOLAGET LM ERICSSON (PUBL), Stockholm (SE)

(72) Inventors: Muhammad Kazmi, Sundbyberg (SE); Iana Siomina, Täby (SE); Icaro Leonardo Jeronimo Da Silva, Solna (SE); Christopher Callender, Kinross (GB); Helka-Liina Määttanen, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/308,838

(22) PCT Filed: Nov. 16, 2018

(86) PCT No.: PCT/EP2018/081630
§ 371 (c)(1),
(2) Date: Dec. 11, 2018

(87) PCT Pub. No.: WO2019/097020
PCT Pub. Date: May 23, 2019

(65) Prior Publication Data
US 2020/0128412 A1    Apr. 23, 2020

Related U.S. Application Data

(60) Provisional application No. 62/587,588, filed on Nov. 17, 2017.

(51) Int. Cl.
*H04W 24/02* (2009.01)
*H04W 8/24* (2009.01)
(Continued)

(52) U.S. Cl.
CPC ............. *H04W 24/02* (2013.01); *H04W 8/24* (2013.01); *H04W 16/28* (2013.01); *H04W 24/10* (2013.01); *H04W 84/042* (2013.01)

(58) Field of Classification Search
CPC .... H04B 7/0617; H04B 7/063; H04B 7/0626; H04B 17/318; H04B 17/21; H04B 7/088;
(Continued)

(56) References Cited

U.S. PATENT DOCUMENTS 6,438,389 B1 *   8/2002   Sandhu ................ H01Q 3/24
                                                370/332
9,252,893 B2 *   2/2016   Liu ...................... H04B 17/309
(Continued)

FOREIGN PATENT DOCUMENTS

EP        3242509 A1      11/2017

OTHER PUBLICATIONS

Intel Corporation; "Way Forward on UE measurement definition and capability"; R4-1709909; 3GPP TSG-RAN WG4 Meeting AH NR#3; Sep. 18-21, 2017; 7 pages; Nagoya, Japan.
(Continued)

*Primary Examiner* — Man U Phan
(74) *Attorney, Agent, or Firm* — Patent Portfolio Builders PLLC

(57) ABSTRACT

Configuration of measurement requirements on cells and beams in NR is made more efficient by, in a user equipment, UE, receiving, information from a network node, which information indicates: a first number K of beams to be measured by the UE, and a second number L of cells in which the UE is required to measure the first number K of beams. The UE then carries out measurements using the received information; and performs at least one operational task based on a result of the measurements.

12 Claims, 7 Drawing Sheets

(51) Int. Cl.
*H04W 16/28* (2009.01)
*H04W 24/10* (2009.01)
*H04W 84/04* (2009.01)

(58) Field of Classification Search
CPC .................. H04B 7/0695; H04W 36/0083; H04W 24/08; H04W 24/10; H04W 16/28; H04W 24/02; H04W 36/0094; H04W 8/24; H04W 84/042; H04W 36/0085
USPC .......................................... 370/252
See application file for complete search history.

(56) References Cited

U.S. PATENT DOCUMENTS

| | | | | |
|---|---|---|---|---|
| 9,729,219 | B2* | 8/2017 | Chapman | H04W 36/08 |
| 10,389,418 | B2* | 8/2019 | Kakishima | H04B 7/0456 |
| 10,524,150 | B2* | 12/2019 | Moon | H04L 5/0048 |
| 10,541,741 | B2* | 1/2020 | Islam | H04B 7/0814 |
| 10,542,544 | B2* | 1/2020 | Zhang | H04B 7/04 |
| 2017/0324459 | A1* | 11/2017 | Koskela | H04W 24/08 |
| 2019/0393946 | A1* | 12/2019 | Guo | H04B 7/088 |
| 2020/0021336 | A1* | 1/2020 | Da Silva | H04B 7/0626 |
| 2020/0084653 | A1* | 3/2020 | Moon | H04L 5/0048 |

OTHER PUBLICATIONS

International Search Report and Written Opinion in International Application No. PCT/EP2018/081630 dated Mar. 4, 2019.
LG Electronics; "Discussion and simulation results for NR SLS"; R4-1710858; 3GPP TSG-RAN WG4 Meeting #84bis; Oct. 9-13, 2017; 18 pages; Dubrovnik, Croatia.
Sony; "Cell quality measurement evaluation using multiple beams (Was R2-1700141)"; R2-1701504; 3GPP TSG RAN Meeting #97; Feb. 13-17, 2017; 5 pages; Athens, Greece.
3GPP; 3GPP TS 38.300 V1.1.1 (Oct. 2017) Technical Specification, 3rd Generation Partnership Project; Technical Specification Group Radio Access Network; NR; NR and NG-RAN Overall Description; Stage 2 (Release 15); Oct. 2017, 16 pages.
3GPP; 3GPP TS 38.331 V0.1.0 (Oct. 2017) Technical Specification, 3rd Generation Partnership Project; Technical Specification Group Radio Access Network; NR; Radio Resource Control (RRC); Protocol specification (Release 15); Oct. 2017; 42 pages.

\* cited by examiner

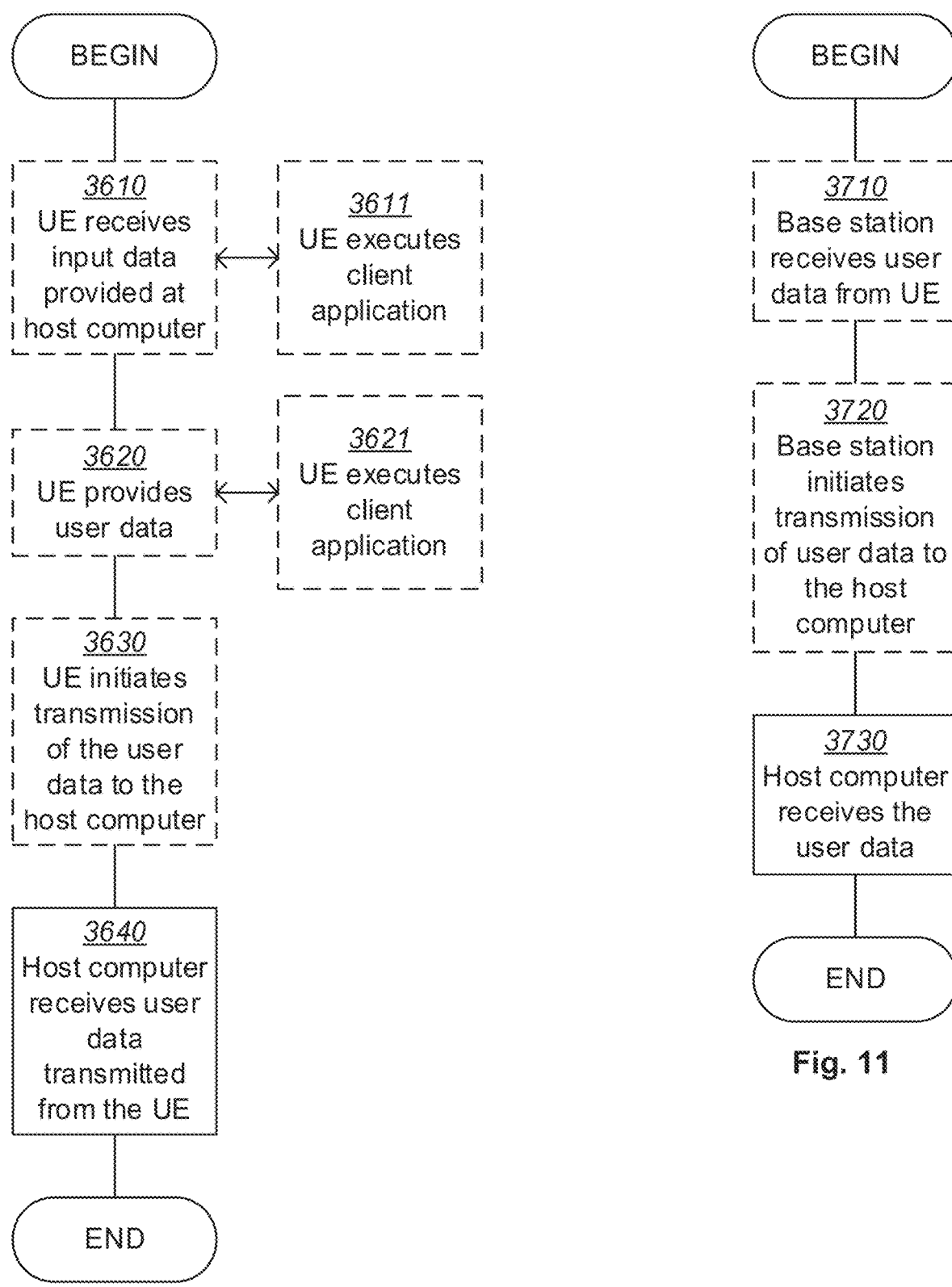

USER EQUIPMENT AND NETWORK NODE FOR CONFIGURING MEASUREMENTS OF CELLS AND BEAMS IN A WIRELESS COMMUNICATION SYSTEM

TECHNICAL FIELD

Embodiments presented herein relate to a user equipment, a network node, methods, computer programs and computer program products for configuring measurements and cells in a wireless communication system.

BACKGROUND

The New Radio (NR—a.k.a. 5G or Next Generation) architecture is being discussed in 3GPP and the current concept is illustrated in FIG. 1. Here, eNB denotes LTE eNodeB, to gNB and ng-eNB (or evolved eNB) denote NR BSs (one NR BS may correspond to one or more transmission/reception points), and the lines between the nodes illustrate the corresponding interfaces which are under discussion in 3GPP. Further, FIG. 2 illustrates deployment scenarios with NR BS which are discussed in 3GPP.

One important architectural consideration is the dual connectivity (DC) operation involving E-UTRA and NR. In one example of Dual Connectivity (DC) operation involving E-UTRA and NR, the E-UTRA is the master. In another example of the DC operation involving E-UTRA and NR, NR is the master. The dual connectivity operation involving only NR serving cells (e.g. NR PCell and NR PSCells) is also envisaged.

Both standalone and non-standalone NR deployments are being standardized in 3GPP. The standalone deployments may be single or multi-carrier (e.g., NR CA or dual connectivity with NR PCell and NR PSCell). The non-standalone (NSA) deployment refers to a dual connectivity (DC) deployment involving E-UTRA and NR where there is LTE PCell and NR PSCell (there may also be one or more LTE SCells and one or more NR SCell). LTE PCell and NR PSCell are configured in MCG and SCG respectively. The MSG and SCG are more generally called as cell groups (CG). The MCG and SCG may be configured with one or more additional serving cells e.g. one or more LTE SCells in MCG and one or more SCells in SCG.

The measurement model used for UE RRM measurements in NR is shown in FIG. 3 (based on TS 38.300). The UE measures one or more beams transmitted by a cell. The beam measurements results are averaged by the UE to derive the cell level measurement e.g. cell quality which can be any type of UE radio measurement. The UE uses up to the N best beams, including the one with the highest signal level and the remaining N-1 whose signal level (e.g. RSRP, RSRQ, SINR, etc.) is above a configurable signal threshold, for deriving the cell level measurement. As shown in FIG. 3 the UE measures (e.g. beam level RSRP) up to K beams over physical layer (L1) measurement (e.g. using L1 filtering) at point A1. Out of these K beams the UE uses N best beams above signal threshold for deriving the cell quality (e.g. cell level RSRP etc.) at point B. The cell level measurement available at point B is based on a function to perform L1 filtering of the N best beams above the signal threshold. Examples of functions are average, xth percentile etc. The network node can further configure the UE to perform higher layer time domain filtering (e.g. L3 filtering) of beam level measurements and/or cell level measurements. In this case the UE may further perform higher layer time domain filtering of beams level L1 measurement results and/or cell level L1 measurement results as shown at point E and point C respectively.

The measurements on K beams can be performed on any suitable signals configured by the network node e.g. on signals in SS block, CSI-RS resources, discovery signals, positioning reference signals etc. A SS block in NR transmits PSS, SSS and PBCH, where PBCH symbols also contain DMRS. RSRP, RSRQ and SINR measured on reference signals in SS block (e.g. SS/PBCH block) are also called as SS-RSRP. SS-RSRQ and SS-SINR respectively. RSRP, RSRQ and SINR measured on CSI-RS are also called as CSI-RSRP. CSI-RSRQ and CSI-SINR respectively. For simplicity generic terms like RSRP, RSRQ and SINR are used.

It was later agreed in RAN2 that N can be set per reference signal, i.e., different values for SS/PBCH block and CSI-RS, within the measurement object. These parameters are the following:
  nroSS-BlocksToAverage::INTEGER (2..maxNroSS-BlocksToAverage)
  nroCSI-RS-ResourcesToAverage::INTEGER (2..maxNroCSI-RS-ResourcesToAverage)

As in LTE, in NR the UE is also required to perform measurements (e.g. RSRP, RSRQ, SINR etc.) on certain number of cells, such that measurement events (e.g. A1-A6) can be triggered and measurement reports can be transmitted from the UE to the network node.

However, in NR, these measurements shall be derived based on L1 filtered beam measurements on the further basis of SS/PBCH blocks (SSB) or CSI-RS resources. Further, the measurement performance of the cell level measurement is impacted by the total number of beams that are L1 filtered (even before the combination function where the average and/or selection of best beams are performed) and the signal level of the beams used to derive the cell level measurement. It should also be noted that the total number of beams per cell that the UE measures affects the performance of cell measurement results.

Additionally, in NR, the UE may be configured to report beam measurement information, based on layer 3 filtered beam-level measurements. It has also been agreed that the network can configure the UE to report multiple quantities (e.g. RSRP, RSRQ, RSRP) for cells and beams, and they do not necessarily need to be consistent. This will require the UE to measure an even larger number of beams in total and possibly maintain a significant number of L1 filters. This is needed in some other scenarios e.g. when the network wants to reduce the ping-pong rate and needs more results per beam, or when the network wants to allocate more dedicated RACH resources per beam during handover. Hence, having more beam measurements per cell may improve performance in some scenarios. On the other hand, this will increase the UE complexity, memory and power consumption. Therefore, the applicant has appreciated that a solution is needed which can lead to a reasonable compromise between measurement performance, system impact and UE complexity.

In some scenarios, it is more important to have the UE measuring more cells and possibly triggering measurement reports (even though quality is perhaps based on fewer beam measurements); while in other scenario it is more important to have more beam measurements even though fewer cells are possibly triggering reports.

Since the UE does not know the measurement purpose assuming current information in reportConfig, measId and measObject, if it is limited in its measurement capacity, it does not have information to determine whether to prioritize measurements of more beams even if they are from the same cell, or to prioritize measurements of beams from different cells.

Cell level measurements are used for different purposes e.g. for mobility, positioning, radio resource management (RRM), etc. Furthermore, in some scenarios, a larger number of cells should be measured and reported by the UE.

In NR, as in LTE, the network can configure the UE with the exact measurement information to be reported by configuring a measurement identifier (measId) that links a carrier frequency to be measured (measObject), or more precisely a reference signal transmitted in a given carrier frequency, and a reporting configuration (reportConfig), informing among other things the measurement quantities that should trigger an event (e.g. reference signal received power (RSRP), reference signal received quality (RSRQ) or signal-to-interference noise ratio (SINR)), the measurement quantities to be included in the measurement report, which can be the same as the trigger quantity or combination of quantities (e.g. RSRP/RSRQ, RSRP/SINR, RSRQ/SINR, RSRP/RSRQ/SINR, etc.), the reference signal to be measured (rsType), which can either be SS/PBCH block or CSI-RS and upper limits for the number of cells and beams to be included in a given measurement reports associated to the triggered measId. These two last fields are particularly interesting for the scope of the present disclosure, and they are defined in the current version of TS 38.331 as follows:

maxReportCells::INTEGER (1..maxCellReport)
    Herein, maxCellReport is a constant associated to a requirement for the maximum number of reported cells in a given measurement report (whose value is 8 in LTE and has not been settled in NR yet)

maxNroRsIndexesToReport::INTEGER (1..maxNroIndexesToReport)
    Herein, maxNroIndexesToReport is a constant associated to a requirement for the maximum number of reported beams in a given measurement report (not defined yet in NR and non-existing in LTE).

SUMMARY

An object of embodiments herein is to render the configuration of measurement requirements on cells and beams in NR more efficient.

According to a first aspect there is presented a method for implementation in a user equipment (UE). The method involves receiving, from a network node, information indicating: a first number K of beams to be measured by the UE, and a second number L of cells in which the UE is required to measure the first number K of beams. The method further involves carrying out measurements using the received information; and performing at least one operational task based on a result of the measurements.

Advantageously this method may provide transmitting a message to the network node, which message reflects a capability of the UE to carry out measurements in agreement with the received information. This message is transmitted before the UE receives the information from the network node.

The first number K may preferably specify either a total number of beams to be measured in all the second number L of cells, or a respective number of beams to be measured in each cell of the second number L of cells.

According to a second aspect there is presented a UE for communication with a network node. The UE contains a radio interface and processing circuitry configured to: receive, from the network node, information indicating: a first number K of beams to be measured by the UE, and a second number L of cells in which the UE is required to measure the first number K of beams. The radio interface and processing circuitry are also configured to carry out measurements using the received information; and perform at least one operational task based on a result of the measurements.

According to a third aspect there is presented a method implemented in a network node, which method involves determining a first number K of beams to be measured by a UE and a second number L of cells in which the UE shall measure the first number K of beams. The method further involves transmitting information to the UE, which information indicates the first and second numbers K and L respectively.

According to a fourth aspect there is presented a network node configured for communication with a UE. The network node contains a radio interface and processing circuitry configured to determine a first number K of beams to be measured by the UE and a second number L of cells in which the UE shall measure the first number K of beams. The radio interface and processing circuitry are also configured to transmit information to the UE, which information indicates the first and second numbers K and L respectively.

According to a fifth aspect there is presented a computer program containing computer code which, when run on processing circuitry of a UE, causes the UE to: receive, from the network node, information indicating: a first number K of beams to be measured by the UE, and a second number L of cells in which the UE is required to measure the first number K of beams; carry out measurements using the received information; and perform at least one operational task based on a result of the measurements.

According to a sixth aspect there is presented a computer program product containing a computer-readable storage medium storing the above-defined computer program.

According to a seventh aspect there is presented a computer program containing computer code which, when run on processing circuitry of a network node, causes the network node to be configured to: determine a first number K of beams to be measured by a UE and a second number L of cells in which the UE shall measure the first number K of beams; and transmit information to the UE, which information indicates the first and second numbers K and L respectively.

According to an eighth aspect there is presented a computer program product containing a computer-readable storage medium storing the above-defined computer program.

The above aspects provide flexibility to the network node, e.g. a base station. For example, it allows the network to dynamically configure the UE with the required number of cell level and beam level measurements depending on the use case and scenario. This may improve network performance, whilst limiting UE complexity.

By measuring larger number of beams per cell, the cell level signal quality may be enhanced. This, in turn, may enhance the UE mobility performance, which relies on the accuracy and reliability of the mobility measurements.

By measuring larger number of beams per cell, the network can also configure the UE to report more granular L3 filtered beam measurements, so that mobility performance is improved in terms of handover ping-pong. Furthermore RLF/handover failure is avoided as a larger number of beam measurements allows the serving node to take better handover decisions and, configure more RACH resources per beam in the target cell.

Further, by measuring a larger number of cells, there may be a benefit to the operators who can benefit from knowledge of the presence of any weaker cells, such as positioning using fingerprint matching. This also enables load balancing. For example measurement on larger number of cells enables the network to better distribute multiple UEs that require handovers across different cells.

It is to be noted that any feature of the first, second, third, fourth, fifth, sixth, seventh and eighth aspects may be applied to any other aspect, wherever appropriate. Likewise, any advantage of the first aspect may equally apply to the second, third, fourth, fifth, sixth, seventh and eighth aspect respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The proposed concept is now described, by way of example, with reference to the accompanying drawings, on which:

FIGS. 8-11 are flowcharts illustrating methods implemented in a communication system including a host computer, a network node and a UE.

DETAILED DESCRIPTION

Figure 1:
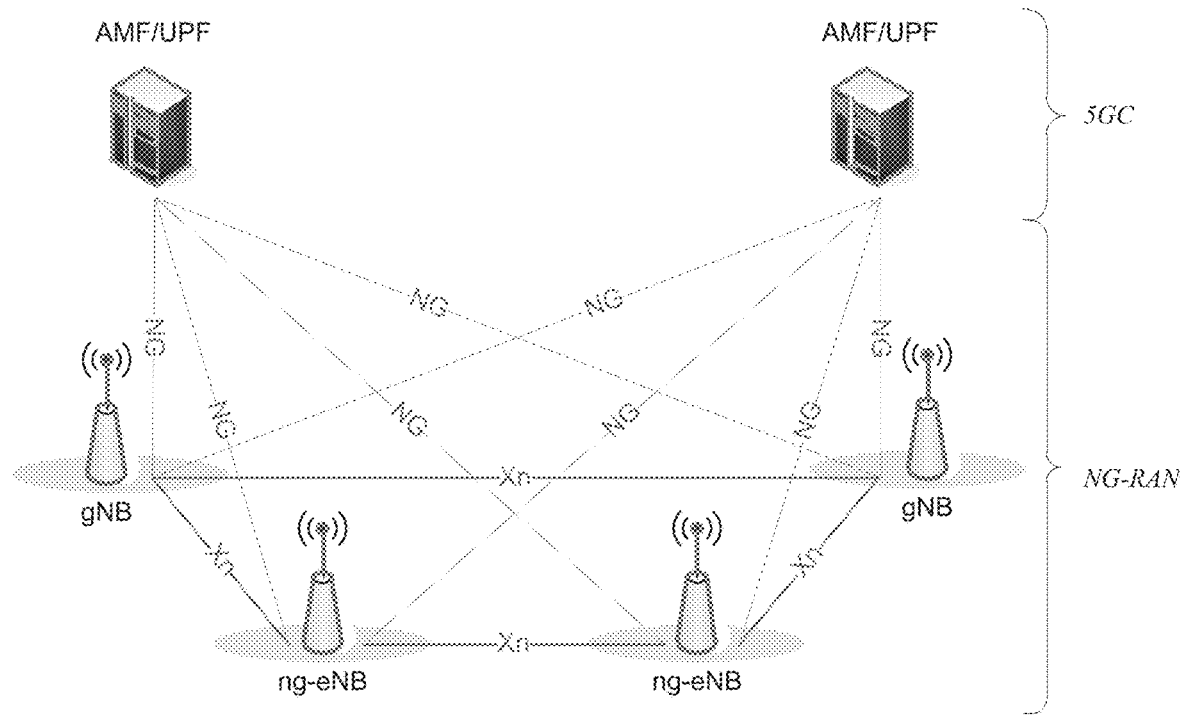
FIG. 1 schematically illustrates a general NR architecture.
Figure 3:
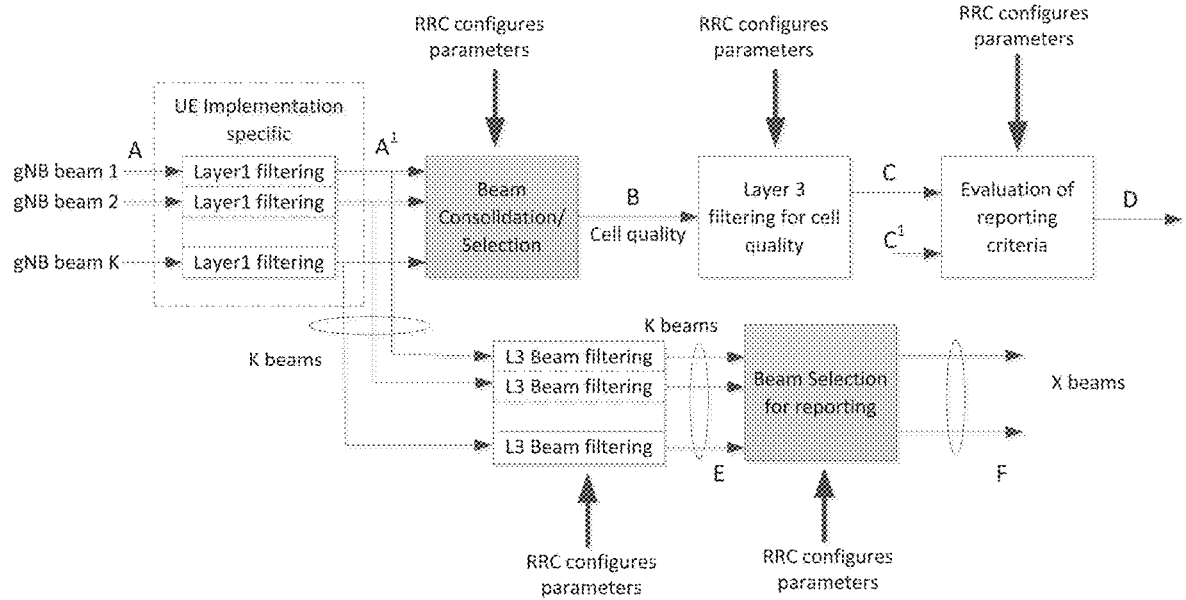
FIG. 3 shows one example of a UE measurement model used in NR that is employed by the UE to derive cell level measurement from beam level measurements.
Figure 2:
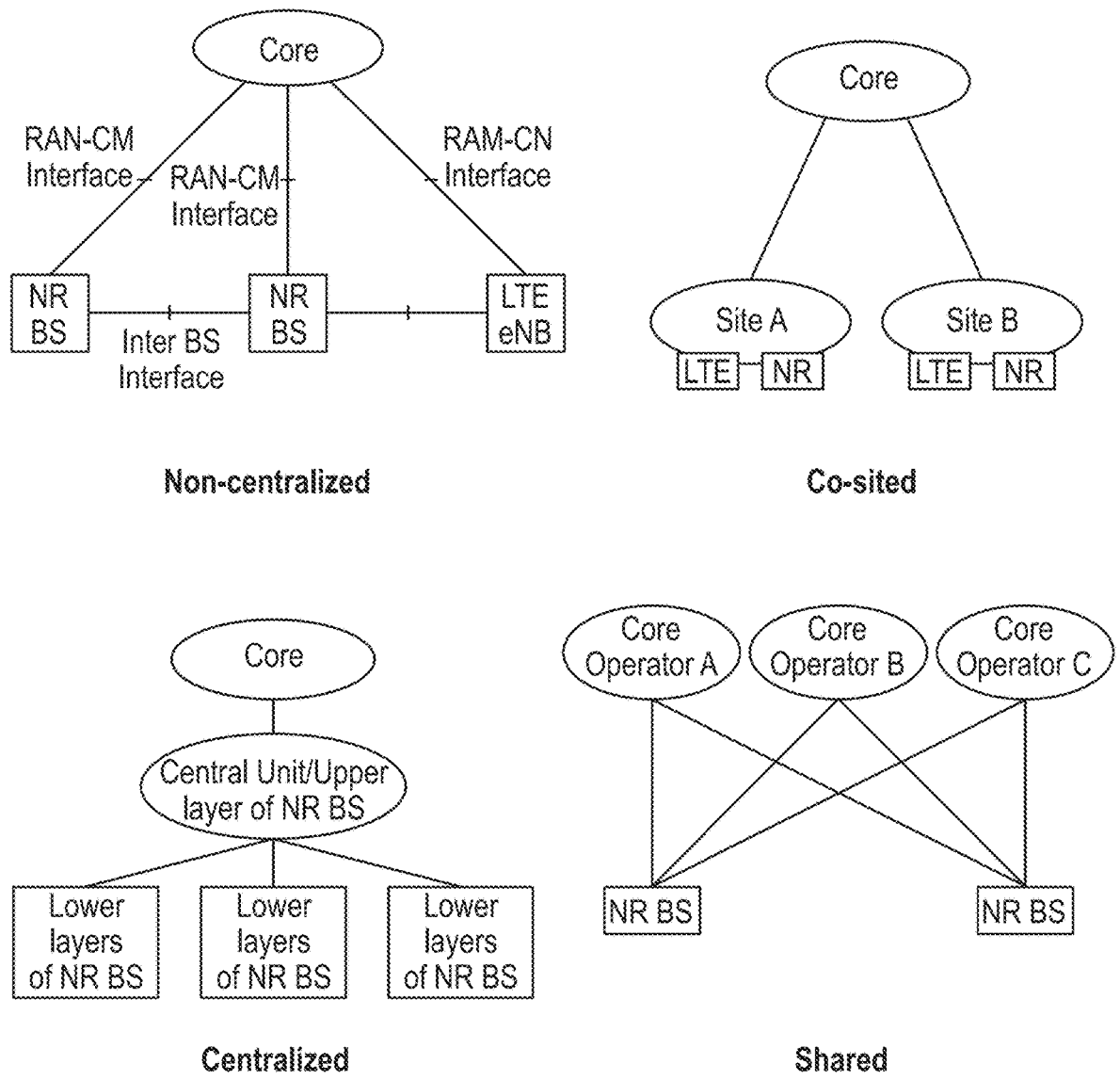
FIG. 2 exemplifies different NR deployments.

The proposed concept will now be described more fully with reference to certain embodiments. This proposed concept may, however, be embodied in many different forms and should not be construed as limited to the embodiments set forth herein; rather, these embodiments are provided by way of example so that this disclosure will be thorough and complete, and will fully convey the scope of the proposed concept to those skilled in the art.

The UE may be configured by a network node with a combination of the number of beam measurements and cell measurements to be performed. The UE is then configured to perform measurement on a combination of at least K number of beams out of the set of detectable beams and at least L number of cells out of the set of detectable cells. The combination of (K, L) parameters also represents an upper limited to the network node for the parameters related to beam, cell reporting (i.e. maxNroRsIndexesToReport) and cell quality derivation (nroSS-BlocksToAverage and nroCSI-RS-ResourcesToAverage). In some embodiments the K number of beams and L number of cells have already been detected and the UE is required to perform measurements on these already detected K number of beams and L number of cells.

In one example, the network node sets the requirement for K to the UE in such a way that all K beams belonging to the same cell are to be measured by the UE e.g. L=1. In another example the K number of beams to be measured by the UE can belong to at least two different cells (e.g. L=2). In yet another example, K is the number of beams per cell, and L is the number of cells. In yet another example, K is the total number of beams over multiple cells, and L is the number of cells. The UE can be configured with the combination of K beams and L cells by explicit signaling and/or via implicit signaling (e.g. indication is associated with the type of measurement, purpose of the measurement etc.). The UE uses the received signaling information for performing the measurements on at least K beams and at least L cells provided that their respective received signal levels are detectable (e.g. if SINR≥−6 dB as a minimum requirement). The UE further uses the results of the measurements for performing one or more operational tasks (e.g. triggering measurement events based on cell measurement results, according to what is configured in reportConfig, reporting cell measurement results to the network node, including L3 filtered beam measurement results in measurement reports, use them for cell reselection, etc.). K and L can be used to prioritize measurements of more beams from the same cell, or to prioritize measurement of beams from different cells.

In some embodiments, different granularities are described with which the parameters K and L can be configured by the network node, such as per carrier frequency, per measurement object, per UE (i.e. within measConfig for all configured measurement identifiers), per reportConfig (e.g. per event), per frequency range, per measurement quantity, per RS type (e.g. SS/PBCH block and CSI-RS) or any combination of the listed possibilities.

In order to be configured by the network node with the parameters K and L, the UE may indicate to the network node a UE measurement capability or capacity in terms of the total number of physical layer L1 measurements that it can perform, including cells and beams or different combinations of the measurements. This enables the network node to ensure that the configured values of K and L do not exceed the UE measurement capability/capacity.

In the below description, the non-limiting term "UE" is used. The UE may be any type of wireless device capable of communicating with network node or another UE over radio signals. The UE may also be radio communication device, target device, device to device (D2D) UE, machine type UE or UE capable of machine to machine communication (M2M), target device, a sensor equipped with UE, iPAD, Tablet, mobile terminals, smart phone, laptop embedded equipped (LEE), laptop mounted equipment (LME), USB dongles, Customer Premises Equipment (CPE) etc.

In some embodiments the generic terminology "network node", is used. Here, the network node can be any kind of the following nodes: a radio network node (e.g. a base station, radio base station, base transceiver station, base station controller, network controller, gNB, en-gNB, nr-eNB, NR BS, evolved Node B (eNB), Node B, Multi-cell/multicast Coordination Entity (MCE), relay node, access point, radio access point, Remote Radio Unit (RRU) Remote Radio Head (RRH), a multi-standard BS (a.k.a. MSR BS), a core network node (e.g., MME, SON node, a coordinating node, positioning node (e.g. location server, SMLC, E-SMLC etc.), MDT node, etc.), or an external node (e.g., 3rd party node, a node external to the current network), etc. Moreover, the network node may contain test equipment.

The term "radio node" used in this disclosure denotes a UE or a radio network node.

The described embodiments are applicable to single carrier as well as to multicarrier operation of the UE. Examples of multicarrier operation are carrier aggregation (CA), multi-connectivity (MC) etc. In CA operation the UE is able to receive and/or transmit data to more than one serving cells. In MC the UE is served by at least two serving cells (e.g. PCell and PSCell) operated by two different network nodes. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly the secondary serving cell is interchangeably called as secondary cell (SCell) or secondary serving cell (SSC).

The term "signaling" used in this disclosure may include anything of the following: high-layer signaling (e.g., via RRC, NAS message or a like), lower-layer signaling (e.g., via a MAC, a physical control channel etc.), or a combination thereof. The signaling may be implicit or explicit. The signaling may further be unicast, multicast or broadcast. The signaling may also be directly to another node or via a third node.

The term "radio measurement" used in this disclosure may refer to any measurement performed on radio signals. Radio measurements can be absolute or relative. Radio measurement may be called as signal level which may be signal quality and/or signal strength. Radio measurements can be e.g. intra-frequency, inter-frequency, CA, etc. The measurements may be cell measurements. The measurement can be performed on one or more cells operating on a frequency layer (e.g. cell specific measurement and/or on a carrier frequency (e.g. carrier specific measurement) which may be common for more than one cells on that carrier. Radio measurements can be unidirectional (e.g., DL or UL) or bidirectional (e.g., RTT, Rx-Tx, etc.). Some examples of radio measurements: timing measurements (e.g., TOA, timing advance, RTT, RSTD, Rx-Tx, propagation delay, etc.), angle measurements (e.g., angle of arrival), power-based measurements (e.g., received signal power, RSRP, SS-RSRP, received signal quality, RSRQ, SS-RSRQ, SINR, SS-SINR, SNR, interference power, total interference plus noise, RSSI, noise power, etc.), cell detection or cell identification, radio link monitoring (RLM), system information (SI) reading, etc.

The term "measurement performance" used in this disclosure may refer to any criteria or metric which characterizes the performance of the measurement performed by a radio node. The term measurement performance is also called as measurement requirement, measurement performance requirements etc. The radio node has to meet one or more measurement performance criteria related to the performed measurement. Examples of measurement performance criteria are measurement time, number of cells to be measured with the measurement time, measurement reporting delay, measurement accuracy, measurement accuracy with respect to a reference value (e.g. ideal measurement result) etc. Examples of measurement time are measurement period, cell identification period, evaluation period, etc.

The term "layer" (or "frequency layer") used in this disclosure may correspond to any carrier frequency of any radio access technology (RAT) e.g. LTE, HSPA, NR etc. The layer is interchangeably called as carrier frequency, carrier frequency layer, frequency, intra-frequency carrier, inter-frequency carrier, inter-RAT carrier frequency, serving carrier frequency, non-serving carrier etc.

Figure 4:
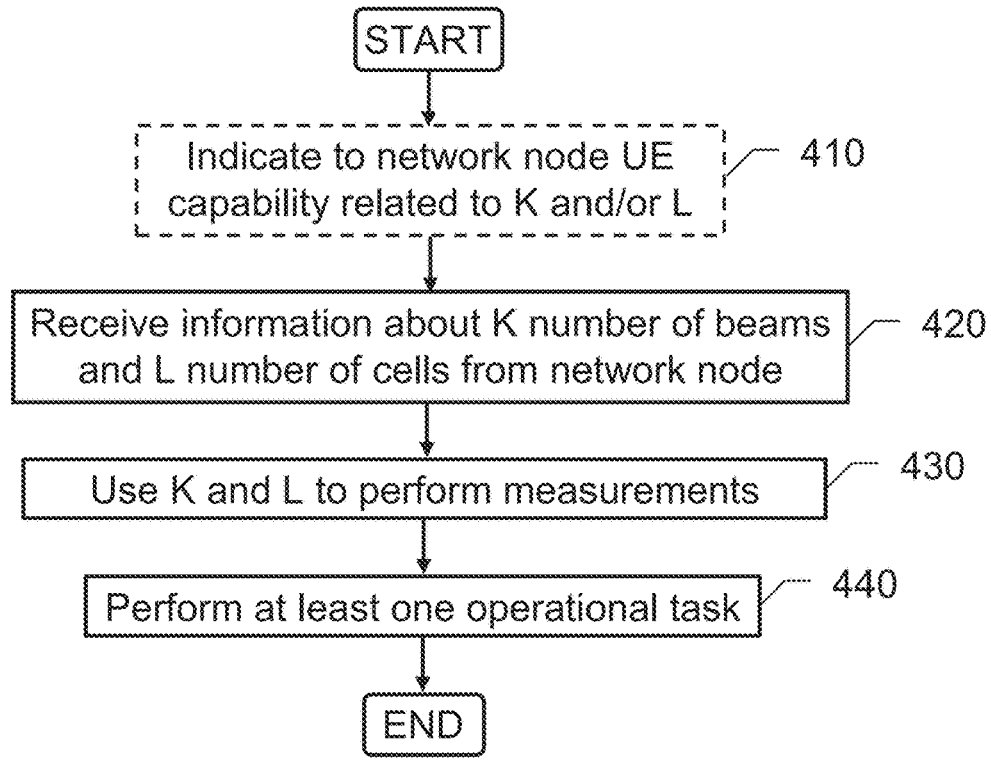
FIG. 4 is a flow chart illustrating a method performed in a UE according to one embodiment.

Referring now to FIG. 4, we will describe a method performed in a UE when receiving and using beam and cell configuration information for measurements according to an embodiment.

Step 410 (optional): Indicate to another network node, the UE's capability related to at least one of K and L, e.g., the maximum of or the supported range of K and/or L. In this embodiment, the method comprises, prior to step 420, transmitting a message to the network node, which message reflects a capability of the UE to carry out measurements, for example cell measurements.

Step 420: Receive from a network node, information about K number of beams (either total number of beams to be measured over multiple cells, or beams to be measured per cell) and L number of cells which the UE is required to measure. In this embodiment, the method comprises receiving, from a network node, information indicating a first number (K) of beams to be measured and a second number (L) of cells in which the UE is required to measure the first number (K) of beams. The first number (K) of beams may be measured qualitatively by the UE. The first number (K) may specify either a total number of beams to be measured in all the second number (L) of cells, or a respective number of beams to be measured in each cell of the second number (L) of cells.

Step 430: Use the received information to perform i.e. carry out measurements, for example cell measurements and optionally, if configured, L3 beam measurements. In this embodiment, the method comprises carrying out measurements using the received information e.g. carrying out measurements in agreement with the received information. The measurements may be cell measurements.

Step 440: Use the results of the measurements to perform one or more operational tasks. Thus, the method may comprise performing at least one operational task based on a result of the measurements.

To implement this method, a UE that is configured to communicate with a network node may have a radio interface and processing circuitry specifically configured to:
 receive, from the network node, information indicating: a first number K of beams to be measured by the UE, and a second number L of cells in which the UE is required to measure the first number K of beams;
 carry out measurements using the received information; and
 perform at least one operational task based on a result of the measurements.

Preferably, the radio interface and the processing circuitry are further configured to transmit a message to the network node, which message reflects a capability of the UE to carry out measurements in agreement with the received information, and which message is transmitted before the UE receives the information from the network node.

According to one embodiment the UE receives information from a network node, the information comprising/indicating a set of K number of beams and L number of cells for performing measurements. The configuration of K and L provides means to the network node to configure the UE with one of a plurality of UE measurement requirements in terms of the minimum number K of beams and the minimum number L cells which the UE is required to measure. This leads to flexibility and enables the network node to ensure that the UE meets the measurement requirements (K and L values) associated with or relevant to the scenario e.g. mobility, positioning etc.

In one example, K is the number of beams per cell, and L is the number of cells. In yet another example, K is the total number of beams over multiple cells, and L is the number of cells. K and L may be further associated with and depend on a carrier frequency. In other words, K and/or L can be signaled in the measurement object (measObject) to the UE. K and L can also be set per RS type, i.e., different values for SS/PBCH block measurements and CSI-Rs measurements. Even if set per RS type, that can also be set within the measObject.

K and L can be further associated and set per frequency range, e.g., below 6 GHz and above 6 GHz. In that case, K and L can be configured in the measConfig where pairs are defined for these ranges and the UE uses them by matching the configured measurement identifiers (measId) associated with the measurement objects (measObject).

K and L may also be further associated and depend on a type of a measurement e.g., either intra-frequency and inter-frequency, periodical or even triggered, etc. K and L may also be further associated and depend on more detailed signal parameters such as a bandwidth (e.g., UE bandwidth, channel bandwidth, measurement bandwidth, etc.). K may also further be associated with and depend on the cell type, e.g., serving cell or neighbor cell, so in principle there may be K1 beams for one or all serving cells and K2 beams for one or all neighbor cells.

K and L may be associated to White Listed Cells. If the network configures for a given carrier 5 white listed cells, the UE derives that L=5 cells and K is distributed across all 5 cells, if detected. In that case, only K may need to be explicitly signaled.

K and L may be associated to white listed beams or equivalent concept. If the network configures for a given frequency CSI-RS resource where each configuration can be associated to a beam, the UE knows exactly how many detectable beams to expect. In other words, the UE can derive that the number K is the number of configured CSI-RS resources per measurement object. And, in that case, only L may need to be explicitly signaled. Or, alternatively, the UE also derives L based on the number of cells it has configure it for the CSI-RS resources.

The UE may be required to perform measurements on at least K number of beams and at least L number of cells provided that the received signal levels from the beams and cells are detectable. It is expected that standards will specify minimum requirements (e.g. thresholds) at which UEs are expected to be able to detect cells. It may also be so that to find and track at least K good enough beams the UE needs to measure on more than L cells, and the other way around—to find and track at least L good enough cells (e.g., whose signal quality is above a certain threshold e.g. SINR is above −6 dB).

In a further embodiment, the number of beams configured for any cell level measurements shall not exceed K when it is the number of beams per cell. Even if the UE is configured with X>K for a cell measurement, the UE may assume X'=min(X, K) and use it for performing the cell measurement. Notice here that the value X is equivalent to the current parameter in the 38.331 specification defined for SS/PBCH block and CSI-RS respectively as nroSS-BlocksToAverage and nroCSI-RS-ResourcesToAverage, defined within each measObject.

The number of beams for cell-level measurements and thus K may also be selected in association with a threshold above which the beam measurements shall be considered by the UE. The lower threshold would typically allow a larger number of beams and would also result in a lower cell-level measurement as compared to when the cell-level measurement is based on the best beam only.

The parameter K may also be used when configuring the set of RLM-RS resources, e.g., the number of RLM-RS resources for the UE shall not exceed K beams per cell for that UE.

The received signal level at the UE corresponds to received power of any one or more signals (e.g., reference signals, synchronization signals, SSB, DMRS, CSI-RS, etc.) transmitted by another node e.g. by a base station. Examples of received signal levels are RSRP, RSRQ, SINR, SNR, SS-SINR, SCH Ês/Iot, CRS Ês/Iot SSB Ês/Iot, CSI-RS Ês/Iot etc. Where in Ês/Iot, Ês is the ratio of received energy per RE (power normalized to the subcarrier spacing) during the useful part of the symbol, i.e. excluding the cyclic prefix, at the UE antenna and Iot is the received power spectral density of the total noise and interference for a certain RE (power integrated over the RE and normalized to the subcarrier spacing) as measured at the UE antenna. Examples of signal thresholds are SSB Es/Iot of −6 dB, SS-RSRP of −115 dBm etc. Herein, SSB is Synchronization Signal Block or SS/PBCH Block, and an SSB signal level is a signal level for one or more of the signals/channels comprised in the SSB. SS is for Synchronization Signal.

In one exemplary implementation the UE may be configured to apply the same set of K number of beams and L number of cells for doing measurement on signals of two or more carrier frequencies. As an example in this case K=32 and L=8 shall be used by the UE for doing measurements on intra-frequency carrier as well as on an inter-frequency carrier. In another exemplary implementation the UE may be configured with a separate set of K number of beams and L number of cells for measurement on signals of each carrier frequency. As an example in this case K=32 and L=8 shall be used by the UE for doing measurements on intra-frequency carrier while K=32 and L=4 shall be used for doing measurements on an inter-frequency carrier.

The UE may determine the set of K and L number of beams and cells respectively by receiving an explicit information from the network node and/or by receiving an implicit information from the network node. In explicit signaling mechanisms, the network node provides explicit information such as pre-defined identifier of the set of K and L values to the UE. The signaling information comprising a pre-defined identifier of a set of K and L values may provide an efficient signaling mechanism. On the other hand, in case of implicit determination the UE determines the set of K and L values which is association with implicit information received from the network node. These two cases are further elaborated below.

Several examples of explicitly signaling the information about a set of K number of beams and L number of cells by the network node to the UE are described below.

In a generic example in table 1, the UE can be configured with any one of M possible sets of K number of beams and L number of cells for doing the measurements on one or more carriers e.g. PCC, SCC, PSC, non-serving carrier etc.

For example the UE can be configured with one of the pre-defined identifiers of the M possible combination sets.

TABLE 1

An example of M combination sets of K beams and L cells

| Combination Set No. | K beams | L cells |
| --- | --- | --- |
| 1 | K1 | L1 |
| 2 | K2 | L2 |
| ... | ... | ... |
| M | Km | Lm |

In an example in table 2, the UE can be configured with any one of 8 possible sets of K number of beams and L number of cells for doing the measurements on one or more carriers e.g. PCC, SCC, PSC, non-serving carrier etc. For example, the UE can be configured by the network node with any set comprising fewer cells (e.g. set no. 1, 2 or 3) for doing measurements which are used for the purpose of mobility. Examples of mobility scenarios are cell selection, cell change etc. Examples of cell change are cell reselection, handover, RRC connection release with redirection etc. The UE can be configured by the network node with any set comprising moderate number of cells (e.g. set no. 4 or 5) for doing measurements which are used for the purpose of network planning related tasks. Examples of such tasks are self-organizing network (SON) functionality or tuning of network configuration parameters (e.g. transmit power of network node, number of antenna ports, transmit power of reference signals (e.g. PSS, SSS, DMRS etc.), measurement bandwidth, power offset between physical channel and reference signal etc.). The UE can be configured by the network node with any set comprising larger number of cells (e.g. set no. 6, 7 or 8) for doing measurements which are used for determining the position of the UE. Examples of positioning methods are enhanced cell ID method, pattern matching, fingerprinting, hybrid positioning which combines two or more positioning methods etc. For example in pattern matching or fingerprinting positioning or OTDOA, which rely on mapping between signal measurements and the location and may even require at least 5-6 signals from different locations (e.g., OTDOA), the measurements on larger number of cells will improve positioning accuracy of the UE or will even make the positioning possible at all. In yet another example, ensuring that the UE reports measurements for two or more cells may also be more important when the UE is approaching or appears at the cell edge and/or moving with a high speed (or speed above a threshold) and therefore may need to perform HO soon, so good cell candidates are needed.

TABLE 2

An example of 8 sets of 32 beams and L (1 to 8) cells

| Combination Set No. | K beams | L cells |
| --- | --- | --- |
| 1 | 32 | 1 |
| 2 | 32 | 2 |
| 3 | 32 | 3 |
| 4 | 32 | 4 |
| 5 | 32 | 5 |
| 6 | 32 | 6 |
| 7 | 32 | 7 |
| 8 | 32 | 8 |

In an example in table 3 the UE can be configured with any one of 4 possible sets of K number of beams and L number of cells for doing the measurements on one or more carriers e.g. PCC, SCC, PSC, non-serving carrier etc. This example of combination sets can also be used for measurements for various purposes (e.g. mobility, positioning etc.) as described in example 2 (for table 2).

TABLE 3

An example of 4 sets of 32 beams and L (1 to 8) cells

| Combination Set No. | K beams | L cells |
| --- | --- | --- |
| 1 | 32 | 1 |
| 2 | 32 | 2 |
| 3 | 32 | 4 |
| 4 | 32 | 8 |

In an example in table 4 the UE can be configured with any one of 2 possible sets of K number of beams and L number of cells for doing the measurements on one or more carriers e.g. PCC, SCC, PSC, non-serving carrier etc. This example of combination sets can be used for measurements for mobility (e.g. set no. 1) and for positioning and for network planning (e.g. set no. 2) etc.). The advantage of this exemplary combination set is reduced signaling overheads since only 1 bit can be used to indicate the configured set. This also reduced UE complexity and processing since the UE needs to implement the measurement procedure for only two possible sets.

TABLE 4

An example of 2 sets of 32 beams and L (1 or 8) cells

| Combination Set No. | K beams | L cells |
| --- | --- | --- |
| 1 | 32 | 1 |
| 2 | 32 | 8 |

The example in table 5 is similar to the example in table 3 except that the total number of beams is also smaller (16) for sets 1 and 2 compared to 32 beams in case of sets 3 and 4. Sets 1 and 2 reduce UE complexity while it may lead to less accurate cell level measurement. This is because the cell measurement is derived from beam measurements.

TABLE 5

An example of 4 sets of 16 or 32 beams and L (1 to 8) cells

| Combination Set No. | K beams | L cells |
| --- | --- | --- |
| 1 | 16 | 1 |
| 2 | 16 | 2 |
| 3 | 32 | 4 |
| 4 | 32 | 8 |

The example in table 6 is similar to the example in table 4 except that the total number of beams is also smaller (namely 16) for set 1 (compared to 32 beams in case of set 2). The use of set 1 reduces UE complexity while it may lead to less accurate cell level measurement as described in example 5.

TABLE 6

An example of 2 sets of 16 or 32 beams and L (1 or 8) cells

| Combination Set No. | K beams | L cells |
| --- | --- | --- |
| 1 | 16 | 1 |
| 2 | 32 | 8 |

In another example, at least one of K and L is selected from its corresponding range and configured by the network, e.g., K value is selected from [1..64] and L is selected from [1..8].

In yet another example, the UE is configured with only the number of cells L when UE needs to measure at least one beam per cell.

In the examples herein, not all UEs may be capable of all the set of combinations from a table. In that case, the UE may indicate the sets or range of K and L it is capable of, and based on this capability indication the network node would then configure explicitly or implicitly the K and L which the UE is capable of and shall use those values for doing the measurements.

Several examples of the network node implicitly signaling the information about a set of K number of beams and L number of cells, to the UE are described below.

In the example in table 7, the UE may be configured for performing measurements as well as with the purpose of the measurements. The UE can determine this by information provided in the measurement configuration. For example, if the UE is configured to perform measurements only for mobility then it shall select the combination set no. 1. But if the UE is configured to perform measurements for mobility as well as for network planning then it shall select the combination set no. 2. But if the UE is configured to perform measurements for network planning as well as for positioning then it shall select to the combination set no. 3. But if the UE is configured to perform measurements for only positioning or for a specific positioning method which benefits from measurements from multiple cells and/or different locations (e.g., OTDOA measurements) then it shall select the combination set no. 4. The UE can be configured for doing measurement for different purposes by the same network node (e.g. BS) or by different network nodes (e.g. by base station for mobility related measurements while by positioning node for positioning measurements etc.).

TABLE 7

An example of relation between 4 different sets and their use case scenarios

| Combination Set No. | K beams | L cells | Purpose/scenario for measurements |
| --- | --- | --- | --- |
| 1 | 32 | 1 | Mobility |
| 2 | 32 | 2 | Mobility, network planning |
| 3 | 32 | 4 | Network planning, positioning |
| 4 | 32 | 8 | Positioning |

In the example in table 8, if the UE is configured for performing measurements only for mobility then it shall select set 1. However, if the UE is configured for performing measurements for network planning as well as for positioning then it shall select set 2.

TABLE 8

An example of relation between 2 different sets and their use case scenarios

| Combination Set No. | K beams | L cells | Purpose/scenario for measurements |
| --- | --- | --- | --- |
| 1 | 32 | 1 | Mobility |
| 2 | 32 | 8 | Positioning, network planning |

After determining the parameter K number of beams, the UE uses this parameter for performing beam level measurements on K beams. The beam level measurement results can further be used by the UE for deriving cell level measurements for L cells as described above. The beam level measurements can also be reported to the network node.

The UE uses the measurement results (e.g. RSRP, RSRQ, identified cell etc.) for performing one or more operational tasks. Examples of tasks are mobility procedure, positioning, reporting the measurement results to a network node (e.g. serving cell), reporting the measurement results to another UE which is capable of D2D operation etc.

The network node may use the received results for one or more operational tasks e.g. mobility, positioning etc.

Examples of UE mobility procedures in low activity RRC states are cell selection and cell reselection including intra-frequency, inter-frequency and inter-RAT (e.g. between UTRA to LTE etc.). Examples of low activity RRC states are RRC idle state, RRC inactive state etc. Examples of UE mobility procedures in high activity RRC states are cell change, handover, RRC connection re-establishment, RRC connection release with direction to target cell, primary component carrier (PCC) change in CA or PCell change in CA etc. Examples of high activity RRC states are RRC connected state, RRC active state etc.

Below follows descriptions of embodiments extending the previous requirement to include L3 filtering.

In another embodiment, the previously described requirement is extended to also comprise the number of L3 filtered measurements.

There can be separated requirements for L3 cell measurements and L3 beam measurements. Hence, the number of quantities that are configured as trigger quantities and reporting quantities influence the number of L3 filters that can be maintained. Hence, in each (K, L) pair a value could be added for number of the L3 beam measurements e.g. X.

There can be joint requirement for L3 cell measurements and L3 beam measurements, i.e., for the total number of L3 measurements the UE shall be required to perform. Hence, the number of quantities that are configured as trigger quantities and reporting quantities influence the number of L3 filters that can be maintained. Hence, in each (K, L) pair a value could be added for number of the L3 beam measurements and L3 cell measurements e.g. X.

As discussed in the previous embodiments, K and L can be configured per measurement object.

Another possibility is that K and L are configured within measurement object but having different values for different RS types.

Another possibility is that K and L are configured within measConfig but having different values for different frequency ranges e.g. FR1 (below 6 GHz) and FR2 (above 6 GHz).

The IE MeasConfig specifies measurements to be performed by the UE, and covers intra-frequency, inter-frequency and inter-RAT mobility as well as configuration of measurement gaps.

Figure 5:
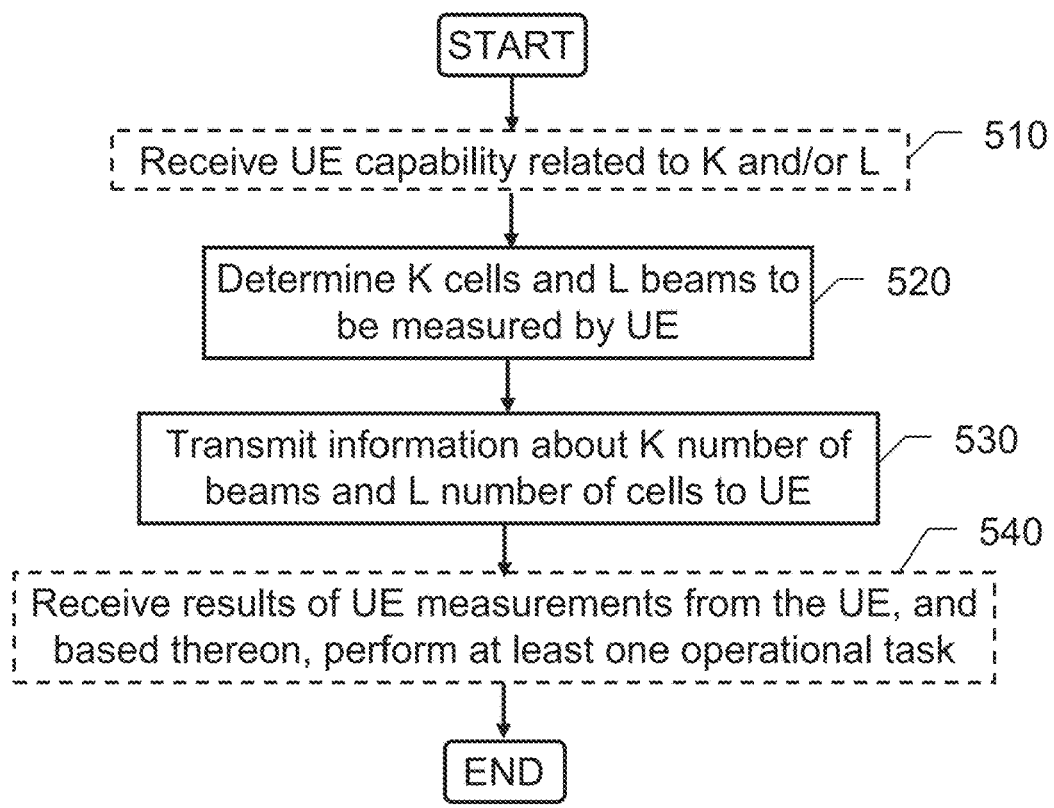
FIG. 5 is a flow chart illustrating a method performed in a network node according to one embodiment.

Referring now to FIG. 5, we will describe a method performed in a network node when determining and transmitting configuration beam and cell configuration information to a UE for measurements according to an embodiment.

Step 510 (optional): Receive a capability from the UE related to at least one of K and L, e.g., the supported maximum or the range of K and/or L. The network node may use this capability when determining the K and L for the UE so that they are within the UE capability. In this embodiment, the method may comprise receiving a message from the UE, which message reflects the capability of the UE to carry out measurements.

Step 520: Determine K number of beams and L number of cells which the UE is required to measure. Thus, in this embodiment, the method may comprise determining a first number (K) of beams to be measured by a UE and a second number (L) of cells in which the UE shall measure the first number (K) of beams. The first number (K) may specify either a total number of beams to be measured in all the second number (L) of cells, or a respective number of beams to be measured in each cell of the second number (L) of cells.

Step 530: Transmit information relating to the determined parameters K and L to the UE. Thus, in this embodiment, the method may comprise transmitting information to the UE, which information indicates the first and second numbers (K,L).

Step 540: (optional) Receive from the UE, results of the measurements performed by the UE based on the received information and use the results for performing one or more operations (e.g. cell change, positioning etc.).

To implement this method, a network node (e.g. a base station) that is configured to communicate with a UE, may have a radio interface and processing circuitry specifically configured to:
  determine a first number K of beams to be measured by the UE and a second number L of cells in which the UE shall measure the first number K of beams; and
  transmit information to the UE, which information indicates the first and second numbers K and L respectively.

Preferably, the radio interface and processing circuitry are further configured to receive a message from the UE, which message reflects a capability of the UE to carry out measurements in agreement with the transmitted information, and which message is received before transmitting the information to the UE.

According to one aspect of this embodiment, the network node uses one or more criteria for determining a set of K beams and L cells on which the UE is required to perform measurements. The criteria can be associated with the scenario or purpose for which the measurements performed by the UE are to be used. Examples of such criteria are:
Mobility, such as cell change as described in the above examples,
Network planning, such as tuning of parameters related to network operation as described in the above examples, and
Positioning, such as fingerprinting as described in the above examples.

In this example, the network node, after determining the purpose(s) of the measurements, shall use it for selecting one of said plurality of sets of K cells and L beams which the UE is required to measure. Any of the examples described in tables 1-8 are also applicable to this embodiment related to the method in the network node. For example according to the example in table 7, the network node selects combination set no. 1 if the UE is to be configured for performing measurements which shall be used only for mobility. But if the UE is to be configured to perform measurements for mobility as well as for network planning then the network node shall select the combination set no. 2 in table 7. But if the UE is to be configured for performing measurements for network planning as well as for positioning then the network node shall select the combination set no. 3. But if the UE is to be configured for performing measurements for only positioning then the network node shall select the combination set no. 4.

The network node shall, after determining the appropriate combination set of K beams and L cells, transmit the information about the selected set to the UE. The information may be expressed in terms of pre-defined identifiers of the set as described above. The information may be transmitted to the UE via higher layer signaling and/or via lower layer signaling. Examples of higher layer signaling are RRC messages, positioning protocol messages (e.g. LPP, NPP etc.) etc. Examples of lower layer signaling are MAC command, layer 1 (L1) messages (e.g. DL control channel such as PDCCH) etc.

The network node may further receive from the UE the results of the measurements performed by the UE based on information related to K and L parameters. The network node uses the received results for performing one or more operational tasks e.g. cell change such as handover (HO), positioning, tuning of parameters for transmitting and/or receiving signals between the UE and the network node etc.

The network node can consistently configure parameters for cell quality derivation per UE within the measObject jointly with the selection of K and L. These parameters are:
  absThreshCSI-RS-Consolidation: in addition to the strongest, the CSI-RS beams to be averaged have to be above that threshold.
  absThreshSS-BlocksConsolidation: in addition to the strongest, the SS/PBCH block beams to be averaged have to be above that threshold.
  nroSS-BlocksToAverage: maximum number of SS/PBCH block beams that are averaged for cell quality derivation, always including the best beam (i.e. with highest measured quantity).
  nroCSI-RS-ResourcesToAverage: maximum number of CSI-RS beams that are averaged for cell quality derivation, always including the best beam (i.e. with highest measured quantity).

The network node can consistently link multiple reportConfig to the same measObject (from which K and L are associated) via measId(s) also based on the configured values of K and L. For example, beam reporting fields within reportConfig can be consistently set based on the configured K and L. Some of these parameters are the following:
  reportQuantityCell: defines which quantities are to be included in the triggered measurement report i.e. it requires cell measurements and additional L3 filter per quantity (e.g. SINR, RSRP, RSRQ and combinations of 2 of these, all of these 3). Hence, L limits to certain extent how this can be set. A large L allows a large value reportQuantityCell if there is also a limit in the number of L3 filters the UE can perform i.e. in that case the number of measurement quantities matter.
  maxReportCells: defines the maximum number of cells to be included in a triggered measurement report, except for serving cells.
  reportQuantityRsIndexes: defines which beam measurement quantities are to be included in the triggered measurement report i.e. it requires cell measurements and additional L3 beam filter per quantity (e.g. SINR, RSRP, RSRQ and combinations of 2 of these, all of these 3). Hence, K limits to certain extent how this can be set. A large K would allow settings with more combinations if there is also a limit in the number of L3 filters the UE can perform i.e. in that case the number of measurement quantities matter.

The parameters K and L may also be used for determining of or may be determined in association with the threshold for beam selection into the UE's cell-level measurements and the number of best beams X to be used for a cell-level measurement (X should not be larger than K beams per cell).

The parameter K may also be used when configuring the set of RLM-RS resources, e.g., the number of RLM-RS resources for the UE shall not exceed K beams per cell for that UE.

Figure 6:
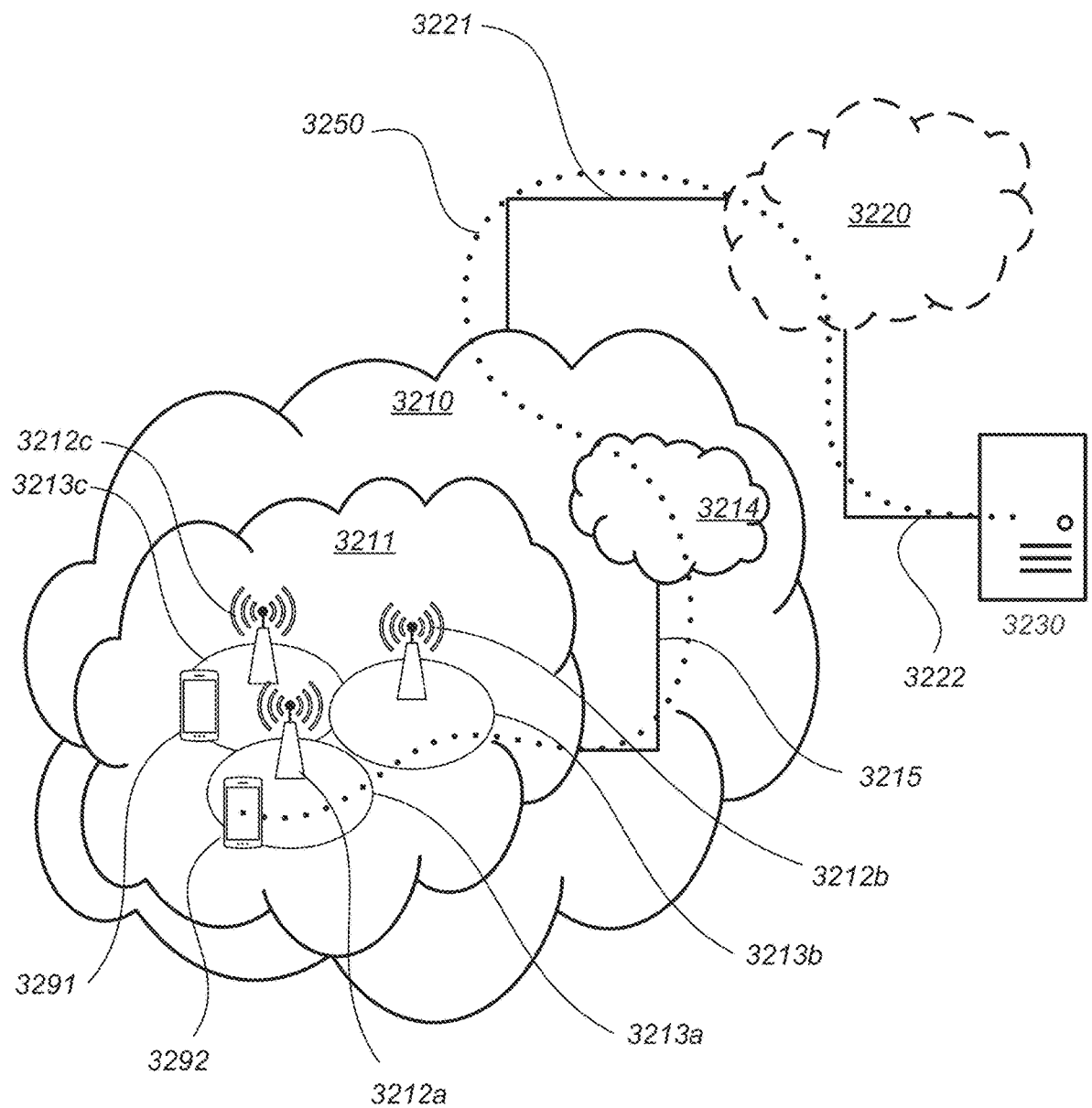
FIG. 6 schematically illustrates a telecommunication network connected via an intermediate network to a host computer.

Referring to FIG. 6, in accordance with an embodiment, a communication system includes a telecommunication network 3210, such as a 3GPP-type cellular network, which comprises an access network 3211, such as a radio access network, and a core network 3214. The access network 3211 comprises a plurality of network nodes, in this example in the form of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 6 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, network node and host computer discussed in the preceding paragraphs will now be described with reference to FIG. 7. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a network node 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 7) served by the network node 3320. The communication interface 3326 may be configured to facilitate a connection 3360 to the host computer 3310. The connection 3360 may be direct or it may pass through a core network (not shown in FIG. 7) of the telecommunication system and/or through one or more intermediate networks outside the telecommunication system. In the embodiment shown, the hardware 3325 of the network node 3320 further includes processing circuitry 3328, which may comprise one or more programmable processors, application-specific integrated circuits, field programmable gate arrays or combinations of these (not shown) adapted to execute instructions. The network node 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a network node serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 7:
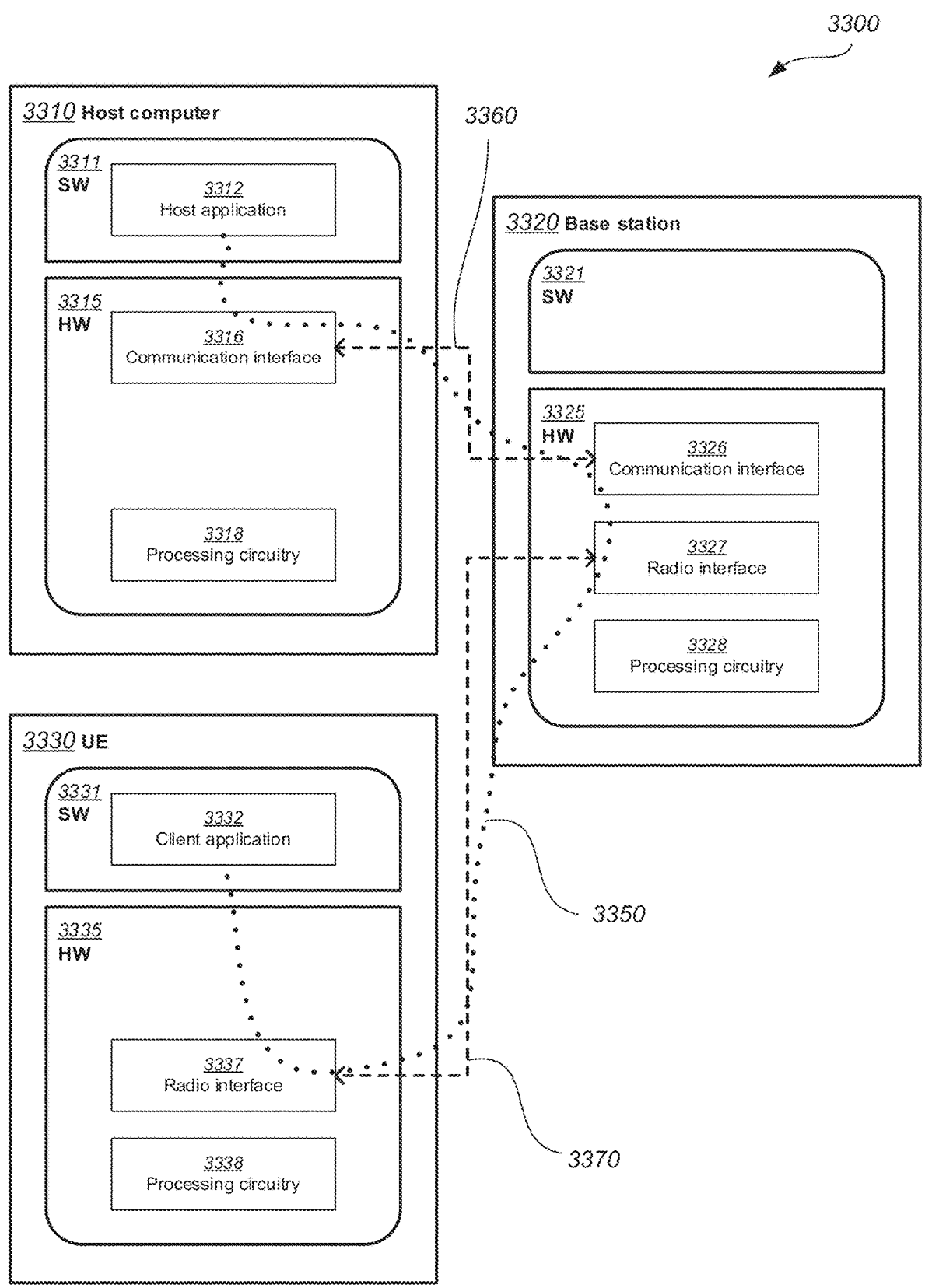
FIG. 7 is a generalized block diagram of a host computer communicating via a network node with a user equipment over a partially wireless connection.

It is noted that the host computer 3310, network node 3320 and UE 3330 illustrated in FIG. 7 may be identical to the host computer 3230, one of the network nodes 3212a, 3212b, 3212c and one of the UEs 3291, 3292 of FIG. 6, respectively. This is to say, the inner workings of these entities may be as shown in FIG. 7 and independently, the surrounding network topology may be that of FIG. 6.

In FIG. 7, the OTT connection 3350 has been drawn abstractly to illustrate the communication between the host computer 3310 and the use equipment 3330 via the network node 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the network node 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the power consumption and thereby provide benefits such as extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the network node 3320, and it may be unknown or imperceptible to the network node 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 8, 9:
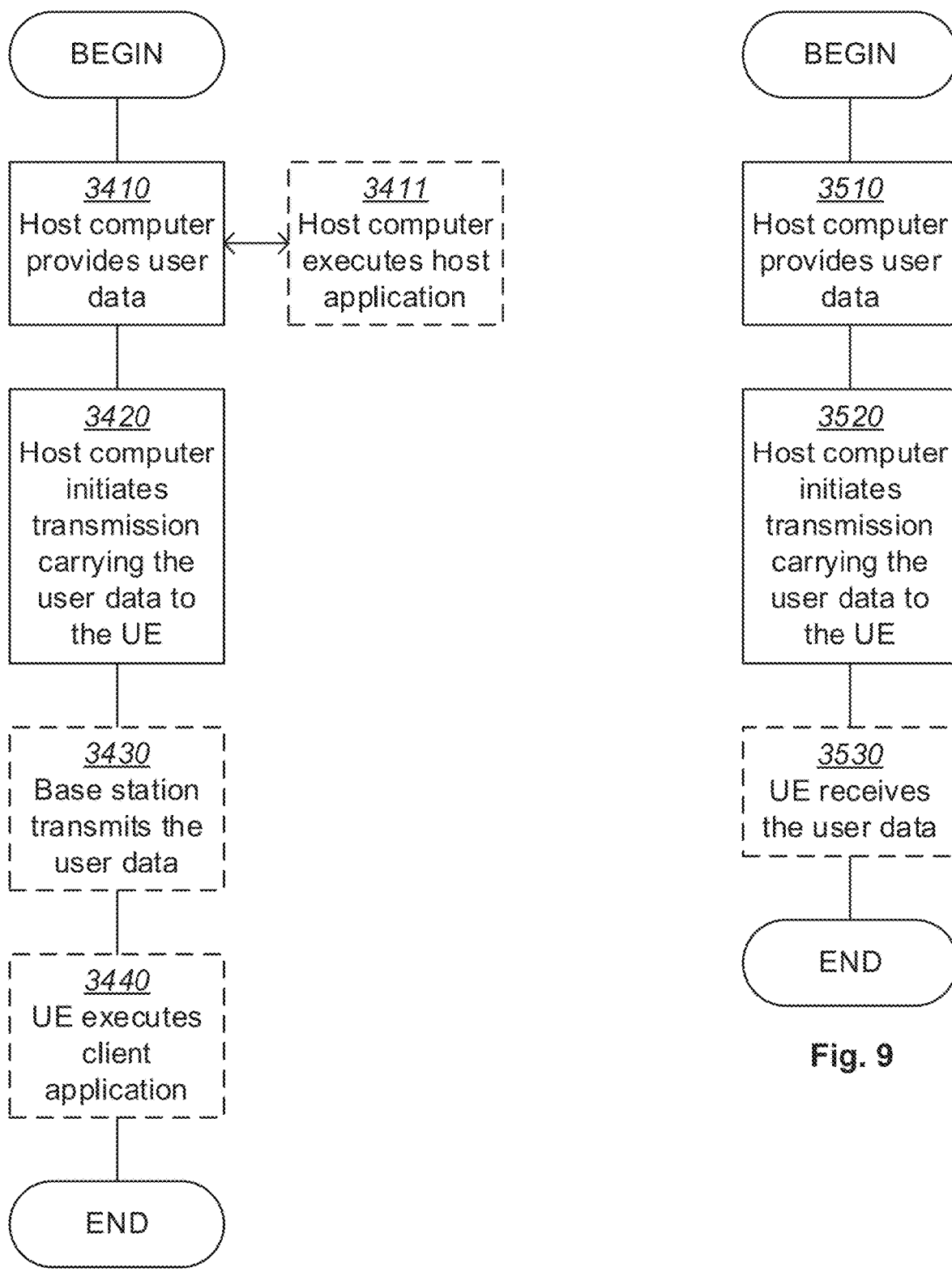

FIG. 8 is a flowchart illustrating a method implemented in a communication system, in accordance with one embodiment. The communication system includes a host computer, a network node and a UE which may be those described with reference to FIGS. 6 and 7. For simplicity of the present disclosure, only drawing references to FIG. 8 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the network node transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 9 is a flowchart illustrating a method implemented in a communication system, in accordance with one embodiment. The communication system includes a host computer, a network node and a UE which may be those described with reference to FIGS. 6 and 7. For simplicity of the present disclosure, only drawing references to FIG. 9 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the network node, in accordance with the teachings of the embodiments described throughout this disclosure. In an optional third step 3530, the UE receives the user data carried in the transmission.

FIG. 10 is a flowchart illustrating a method implemented in a communication system, in accordance with one embodiment. The communication system includes a host computer, a network node and a UE which may be those described with reference to FIGS. 6 and 7. For simplicity of the present disclosure, only drawing references to FIG. 10 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 11 is a flowchart illustrating a method implemented in a communication system, in accordance with one embodiment. The communication system includes a host computer, a network node and a UE which may be those described with reference to FIGS. 6 and 7. For simplicity of the present disclosure, only drawing references to FIG. 11 will be included in this section. In an optional first step 3710 of the method, in accordance with the teachings of the embodiments described throughout this disclosure, the network node receives user data from the UE. In an optional second step 3720, the network node initiates transmission of the received user data to the host computer. In a third step 3730, the host computer receives the user data carried in the transmission initiated by the network node.

Numbered Embodiments

1. A communication system including a host computer comprising:
   processing circuitry configured to provide user data; and
   a communication interface configured to forward the user data to a cellular network for transmission to a user equipment (UE),
   wherein the cellular network comprises a network node having a radio interface and processing circuitry, the network node's processing circuitry is configured to:
      determine a first number (K) of beams to be measured by the UE and a second number (L) of cells in which the UE shall measure the first number (K) of beams; and
      transmit information to the UE, which information indicates the first and second numbers (K; L).
2. The communication system of embodiment 1, further including the network node.
3. The communication system of embodiment 2, further including the UE, wherein the UE is configured to communicate with the network node.
4. The communication system of embodiment 3, wherein:
   the processing circuitry of the host computer is configured to execute a host application, thereby providing the user data; and
   the UE comprises processing circuitry configured to execute a client application associated with the host application.
5. A method implemented in a communication system including a host computer, a network node and a user equipment (UE), the method comprising:
   at the host computer, providing user data; and
   at the host computer, initiating a transmission carrying the user data to the UE via a cellular network comprising the network node, wherein the network node:
      determining a first number (K) of beams to be measured by a user equipment, UE, and a second number (L) of cells in which the UE shall measure the first number (K) of beams; and
      transmitting information to the UE, which information indicates the first and second numbers (K; L).
6. The method of embodiment 5, further comprising:
   at the network node, transmitting the user data.
7. The method of embodiment 6, wherein the user data is provided at the host computer by executing a host application, the method further comprising:
   at the UE, executing a client application associated with the host application.
8. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's processing circuitry configured to:
   receive, from the cellular network, information indicating:
      a first number (K) of beams to be measured by the UE, and
      a second number (L) of cells in which the UE is required to measure the first number (K) of beams;
   carry out measurements using the received information; and
   perform at least one operational task based on a result of the measurements.
9. The communication system of embodiment 8, further including the UE.
10. The communication system of embodiment 9, wherein the cellular network further includes a network node configured to communicate with the UE.
11. The communication system of embodiment 9 or 10, wherein:
   the processing circuitry of the host computer is configured to execute a host application, thereby providing the user data; and
   the UE's processing circuitry is configured to execute a client application associated with the host application.
12. A method implemented in a communication system including a host computer, a network node and a user equipment (UE), the method comprising:
   at the host computer, providing user data; and
   at the host computer, initiating a transmission carrying the user data to the UE via a cellular network comprising the network node, wherein the UE:
   receiving, from a network node, information indicating:
      a first number (K) of beams to be measured by the UE, and
      a second number (L) of cells in which the UE is required to measure the first number (K) of beams;
   carrying out measurements using the received information; and
   performing at least one operational task based on a result of the measurements.
13. The method of embodiment 12, further comprising:
   at the UE, receiving the user data from the network node.
14. A communication system including a host computer comprising:
   a communication interface configured to receive user data originating from a transmission from a user equipment (UE) to a network node,
   wherein the UE comprises a radio interface and processing circuitry, the UE's processing circuitry configured to:
   receive, from the network node, information indicating:
      a first number (K) of beams to be measured by the UE, and
      a second number (L) of cells in which the UE is required to measure the first number (K) of beams;
   carry out measurements using the received information; and
   perform at least one operational task based on a result of the measurements.
15. The communication system of embodiment 14, further including the UE.
16. The communication system of embodiment 15, further including the network node, wherein the network node comprises a radio interface configured to communicate with the UE and a communication interface configured to forward to the host computer the user data carried by a transmission from the UE to the network node.

17. The communication system of embodiment 15 or 16, wherein:
the processing circuitry of the host computer is configured to execute a host application; and
the UE's processing circuitry is configured to execute a client application associated with the host application, thereby providing the user data.

18. The communication system of embodiment 16 or 17, wherein:
the processing circuitry of the host computer is configured to execute a host application, thereby providing request data; and
the UE's processing circuitry is configured to execute a client application associated with the host application, thereby providing the user data in response to the request data.

19. A method implemented in a communication system including a host computer, a network node and a user equipment (UE), the method comprising:
at the host computer, receiving user data transmitted to the network node from the UE, wherein the UE:
receiving, from a network node, information indicating:
a first number (K) of beams to be measured by the UE, and
a second number (L) of cells in which the UE is required to measure the first number (K) of beams;
carrying out measurements using the received information; and
performing at least one operational task based on a result of the measurements.

20. The method of embodiment 19, further comprising:
at the UE, providing the user data to the network node.

21. The method of embodiment 20, further comprising:
at the UE, executing a client application, thereby providing the user data to be transmitted; and
at the host computer, executing a host application associated with the client application.

22. The method of embodiment 21, further comprising:
at the UE, executing a client application; and
at the UE, receiving input data to the client application, the input data being provided at the host computer by executing a host application associated with the client application,
wherein the user data to be transmitted is provided by the client application in response to the input data.

23. A communication system including a host computer comprising a communication interface configured to receive user data originating from a transmission from a user equipment (UE) to a network node, wherein the network node comprises a radio interface and processing circuitry, the network node's processing circuitry configured to:
determine a first number (K) of beams to be measured by the UE and a second number (L) of cells in which the UE shall measure the first number (K) of beams; and
transmit information the UE, which information indicates the first and second numbers (K; L).

24. The communication system of embodiment 23, further including the network node.

25. The communication system of embodiment 24, further including the UE, wherein the UE is configured to communicate with the network node.

26. The communication system of embodiment 25, wherein:
the processing circuitry of the host computer is configured to execute a host application;
the UE is configured to execute a client application associated with the host application, thereby providing the user data to be received by the host computer.

The invention claimed is:

1. A method implemented in a user equipment, UE, the method comprising:
receiving, from a network node, information indicating:
a first number (K) of beams to be measured by the UE, and
a second number (L) of cells in which the UE is required to measure the first number (K) of beams;
carrying out measurements using the received information; and
performing at least one operational task based on a result of the measurements,
wherein the first number (K) specifies either:
a total number of beams to be measured in all the second number (L) of cells, or
a respective number of beams to be measured in each cell of the second number (L) of cells.

2. The method according to claim 1, further comprising:
transmitting a message to the network node, which message reflects a capability of the UE to carry out measurements in agreement with the received information, and which message is transmitted before the UE receives the information from the network node.

3. A user equipment, UE, configured to communicate with a network node, the UE comprising a radio interface and processing circuitry configured to:
receive, from the network node, information indicating:
a first number (K) of beams to be measured by the UE, and
a second number (L) of cells in which the UE is required to measure the first number (K) of beams;
carry out measurements using the received information; and
perform at least one operational task based on a result of the measurements,
wherein the first number (K) specifies either:
a total number of beams to be measured in all the second number (L) of cells, or
a respective number of beams to be measured in each cell of the second number (L) of cells.

4. The UE according to claim 3, wherein the radio interface and the processing circuitry are further configured to:
transmit a message to the network node, which message reflects a capability of the UE to carry out measurements in agreement with the received information, and which message is transmitted before the UE receives the information from the network node.

5. A method implemented in a network node, the method comprising:
determining a first number (K) of beams to be measured by a user equipment, UE, and a second number (L) of cells in which the UE shall measure the first number (K) of beams; and
transmitting information to the UE, which information indicates the first and second numbers (K; L)
wherein the first number (K) specifies either:
a total number of beams to be measured in all the second number (L) of cells, or
a respective number of beams to be measured in each cell of the second number (L) of cells.

6. The method according to claim 5, further comprising:
receiving a message from the UE, which message reflects a capability of the UE to carry out measurements in agreement with the transmitted information, and which message is received before transmitting the information to the UE.

7. A network node configured to communicate with a user equipment, UE, the network node comprising a radio interface and processing circuitry configured to:
   determine a first number (K) of beams to be measured by the UE and a second number (L) of cells in which the UE shall measure the first number (K) of beams; and
   transmit information to the UE, which information indicates the first and second numbers (K; L),
wherein the first number (K) specifies either:
   a total number of beams to be measured in all the second number (L) of cells, or
   a respective number of beams to be measured in each cell of the second number (L) of cells.

8. The network node according to claim 7, wherein the radio interface and processing circuitry are further configured to:
   receive a message from the UE, which message reflects a capability of the UE to carry out measurements in agreement with the transmitted information, and which message is received before transmitting the information to the UE.

9. A computer program comprising computer code which, when run on processing circuitry of a user equipment, UE, causes the UE to be configured to:
   receive, from a network node, information indicating:
      a first number (K) of beams to be measured by the UE, and
      a second number (L) of cells in which the UE is required to measure the first number (K) of beams;
   carry out measurements using the received information; and
   perform at least one operational task based on a result of the measurements,
wherein the first number (K) specifies either:
   a total number of beams to be measured in all the second number (L) of cells, or
   a respective number of beams to be measured in each cell of the second number (L) of cells.

10. The computer program according to claim 9, wherein the computer program is stored on a computer-readable storage medium.

11. A computer program comprising computer code which, when run on processing circuitry of a network node, causes the network node to be configured to:
   determine a first number (K) of beams to be measured by a user equipment, UE and a second number (L) of cells in which the UE shall measure the first number (K) of beams; and
   transmit information to the UE, which information indicates the first and second numbers (K; L),
wherein the first number (K) specifies either:
   a total number of beams to be measured in all the second number (L) of cells, or
   a respective number of beams to be measured in each cell of the second number (L) of cells.

12. The computer program according to claim 11, wherein the computer program is stored on a computer-readable storage medium.

* * * * *

UNITED STATES PATENT AND TRADEMARK OFFICE
CERTIFICATE OF CORRECTION

PATENT NO. : 11,006,287 B2
APPLICATION NO. : 16/308838
DATED : May 11, 2021
INVENTOR(S) : Kazmi et al.

Page 1 of 2

It is certified that error appears in the above-identified patent and that said Letters Patent is hereby corrected as shown below:

In the Specification

In Column 1, Line 18, delete "to gNB" and insert -- gNB --, therefor.

In Column 1, Line 43, delete "(CG)." and insert -- (CGs). --, therefor.

In Column 1, Line 49, delete "measurements" and insert -- measurement --, therefor.

In Column 2, Lines 19-20, delete "(2..maxNroSS-BlocksToAverage)" and insert
-- (2..maxNroSS-BlocksToAverage), --, therefor.

In Column 2, Lines 21-22, delete "(2..maxNroCSI-RS-ResourcesToAverage)" and insert
-- (2..maxNroCSI-RS-ResourcesToAverage). --, therefor.

In Column 2, Line 30, delete "(SSB)" and insert -- (SSBs) --, therefor.

In Column 3, Line 17, delete "signal-to-interference noise ratio (SINR))," and insert
-- signal-to-interference-plus-noise ratio (SINR)), --, therefor.

In Column 6, Line 1, delete "limited" and insert -- limit --, therefor.

In Column 6, Line 58, delete "equipped" and insert -- equipment --, therefor.

In Column 7, Line 5, delete "etc." and insert -- etc.). --, therefor.

In Column 7, Line 44, delete "measurement" and insert -- measurement) --, therefor.

In Column 12, Line 27, delete "etc.)." and insert -- etc. --, therefor.

In Column 14, Line 54, delete "X." and insert -- X*. --, therefor.

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*

In Column 15, Line 27, delete "(K,L)." and insert -- (K, L). --, therefor.

In Column 19, Line 24, delete "use" and insert -- user --, therefor.

In the Claims

In Column 24, Line 59, in Claim 5, delete "L)" and insert -- L), --, therefor.